UNITED STATES PATENT OFFICE.

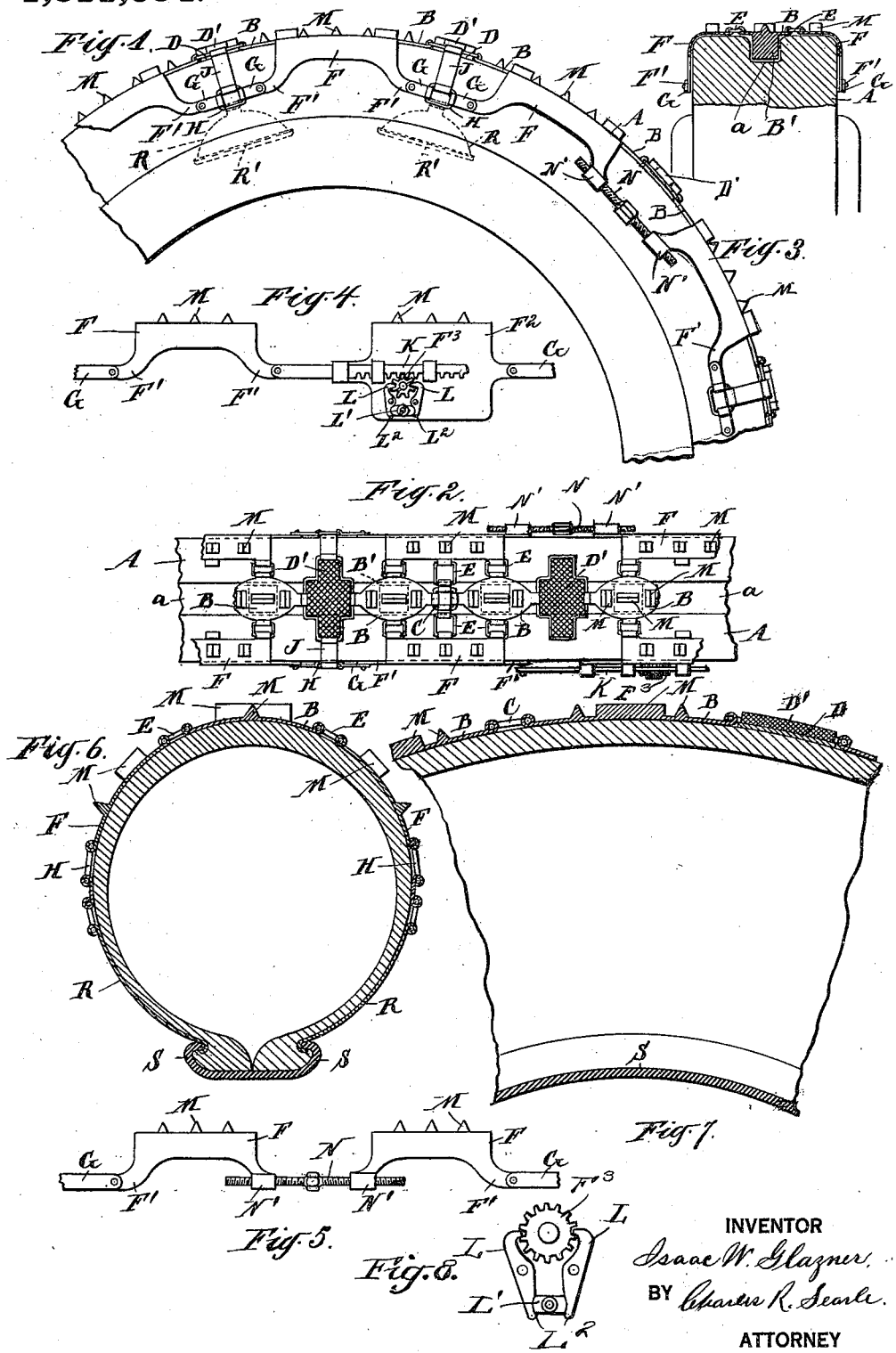

ISAAC W. GLAZNER, OF BROOKLYN, NEW YORK.

ANTISKID DEVICE FOR VEHICLE-WHEELS.

1,311,554.  Specification of Letters Patent.  Patented July 29, 1919.

Application filed August 24, 1917. Serial No. 187,941.

*To all whom it may concern:*

Be it known that I, ISAAC W. GLAZNER, a citizen of the United States, residing in the city of New York, borough of Brooklyn, in the county of Kings and State of New York, have invented a certain new and useful Improvement in Antiskid Devices for Vehicle-Wheels, of which the following is a specification.

The invention relates to means for holding the wheels of automobiles, auto-trucks and like vehicles against sliding movements or "skidding", and the object of the invention is to provide such means in a form which will be efficient in service and also avoid injury to the tire to which it is attached.

A further object is to provide easily operable adjustable means for attaching the device to the tire, and means for holding the device against lateral movement relatively to the tire.

The invention consists in certain novel features, and details of construction and arrangement, by which the above objects are attained, to be hereinafter described and claimed.

The accompanying drawings form a part of this specification and show the invention as applied to the wheel of an auto-truck and to the shoe of an automobile tire.

Figure 1 is a side elevation of a portion of an auto-truck wheel equipped with the improved anti-skid device.

Fig. 2 is a corresponding plan or top view.

Fig. 3 is a transverse section through the device and a portion of such auto-truck tire.

Fig. 4 is an elevation showing an adjusting device designed for service on the outer face of a wheel.

Fig. 5 is a similar view of an adjusting device for service on the inner face of a wheel.

Fig. 6 is a transverse section through an automobile shoe and wheel-rim of modified form equipped with the device, and on a larger scale.

Fig. 7 is a corresponding circumferential section.

Fig. 8 is an elevation showing a portion of the adjusting device of Fig. 4, on a larger scale.

Similar letters of reference indicate the same parts in all the figures.

The device consists of a plurality of plates of metal linked together to form a flexible band or armor having spurs and other gripping surfaces, adapted to be attached to and inclose the tread portion of a tire.

A is an auto-truck or like tire, having a central peripheral groove $a$. B B is a series of peripheral plates preferably elliptical in shape having lugs $B^1$ matching to the groove $a$ and serving to hold the plates against lateral movement. The adjacent ends of the adjoining plates B B of the series are loosely connected to a link C, and the opposite ends are loosely joined each to a cross-plate D carrying an outwardly presented pad $D^1$ of rubber, and the sides of each pair of elliptical plates B B are connected by links E E to side-plates F F extending circumferentially on each side of the tire and shaped to conform thereto and a portion of the tread. On the side faces of the plates F F are arms $F^1$ $F^1$ joined by pivoted bars G G to a link H from which extends a strip J loosely joined to the lateral ends of the intermediate cross-plate D.

On the elliptical plates B B and tread portions of the side-plates F F are spurs M arranged to engage the roadbed and with the aid of the rubber pads $D^1$ $D^1$ insure against skidding.

The flexible armor thus constructed incloses the tread portion of the tire and extends inwardly on the side faces thereof. In order to apply the device and secure it in position, it is necessary to provide means for loosening or lengthening the side margins to permit the band to be passed over the periphery of the tire, and then tightening them. This mechanism is shown in Figs. 4 and 5; that shown in Fig. 4 is adapted to serve on the outer face of the wheel and comprises a rack K extending from one of the arms $F^1$ through guides on an adjacent side-plate $F^2$ with freedom to slide therein. On the plate $F^2$ is a pinion $F^3$ in mesh with the rack and turned by a screwdriver or other tool, not shown, to draw the side-plates together and hold the margin of the band taut.

L L are dogs pivotally mounted on the plate $F^2$ arranged to engage the teeth of the pinion and hold it against rotation in either direction. The dogs are controlled by an elliptic cam $L^1$ located between them, arranged to hold the arms L² of the dogs separated in the locked position shown in Fig. 4, and when turned to a right angle, to permit the arms L² L² to approach each other and thus release the pinion. The ends of the cam are concentric to its pivot L³, and the notches in the arms L² L² are curved on the same radius, see Fig. 8, to permit the cam to be turned in locking or unlocking.

The other tightening device, shown in Fig. 5, consists of a turnbuckle or right and left screw N received in bosses N¹ N¹ on adjoining side-plates and turned by a suitable wrench. This form is preferable for the inner face of the wheel to which access for the operation of a tool is not as convenient as the outer face, although it may be used upon either face.

The armor is also adaptable to the annular cylindrical shoe P of an automobile wheel, as shown in Figs. 6 and 7, and in this form the lugs B¹ B¹ are omitted and anchors R employed loosely hung on both margins from the links H, as indicated in dotted lines in Fig. 1, and having each an outwardly curled lip R¹ adapted to engage the rim S of the wheel on both faces of the latter and thus hold the band against lateral movement. The tightening devices above described may be employed in this form also.

Thus applied the armor supports the shoe and lessens the danger of "blow-outs" and also lessens the danger of puncture by protecting a large portion of the tread area.

A feature of great importance is the avoidance of damage to the tire through cutting or abrasion caused by anti-skid devices of the chain type; this is attained by making the plates of relatively large area with smooth inner bearing surfaces adapted to lie in close contact with the tire without being forced therein when under stress.

The arrangement of links and plates may be varied and the number increased or lessened as desired. The rubber pads D¹ may be omitted and spurs substituted, and other means employed in place of the rack and pinion mechanism shown in Fig. 4 or the turnbuckle in Fig. 5, for adjusting the margins of the band.

Any suitable casing may be provided as a covering for the pinion F³ and its dogs.

I claim:—

In a device of the character set forth, a series of peripheral plates and side plates loosely linked together, and the peripheral plates having lugs adapted to engage in a peripheral groove in a tire to hold the same in line circumferentially, and adjustable means on the side plates for holding the plates together to form a band.

In testimony that I claim the invention above set forth I affix my signature in presence of two witnesses:

ISAAC W. GLAZNER.

Witnesses:
CHARLES SHATZ,
ABRAHAM SIMON.